United States Patent
Hallas et al.

[11] 3,869,445
[45] Mar. 4, 1975

[54] 4''-O-SULFONYL ERYTHROMYCIN-9-O-OXIME DERIVATIVES

[75] Inventors: Robert Hallas; John Soloman Tadanier, both of Waukegan; Anne Mary VonEsch, North Chicago, all of Ill.

[73] Assignee: Abbott Laboratories, North Chicago, Ill.

[22] Filed: Dec. 10, 1973

[21] Appl. No.: 423,652

Related U.S. Application Data

[63] Continuation-in-part of Ser. No. 356,988, May 3, 1973, abandoned.

[52] U.S. Cl. .............................. 260/210 E, 424/180
[51] Int. Cl. ........................................... Co7c 129/18
[58] Field of Search ....... 260/210 E, 210 AB, 210 R

[56] References Cited
UNITED STATES PATENTS
3,736,313   5/1973   Jones et al. .................... 260/210 E

*Primary Examiner*—Johnnie R. Brown
*Assistant Examiner*—Cary B. Owens
*Attorney, Agent, or Firm*—Robert L Niblack; James L. Bailey; Vincent A. Mallare

[57] ABSTRACT

Covers sulfonyl derivatives of erythromycin A, B and C falling within the following structural formula:

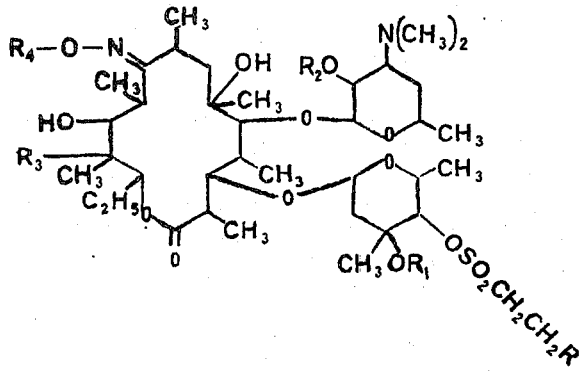

where R is selected from the group consisting of amino, monoalkyl amino, dialkyl amino, alkoxy, morpholino, substituted morpholino, piperazino, substituted piperazino, piperidino, substituted piperidino, alkylthio, alkylsulfonyl, arylthio, substituted arylthio, arylsulfonyl, substituted arylsulfonyl, thiamorpholino, aziridino, substituted aziridino, benzylthio, substituted benzylthio, thiamorpholinosulfone, substituted thiamorpholinosulfone, benzylsulfinyl, substituted benzylsulfinyl, arylsulfinyl, substituted arylsulfinyl, benzylsulfonyl, substituted benzylsulfonyl, cyanoalkyl, halocyanoalkyl, haloalkanoate, dialkanoate, ketoalkyl, ketoalkanoate, benzylamino, substituted benzylamino, benzoxy, substituted benzoxy, phenoxy, substituted phenoxy, benzycyano, and substituted benzylcyano; $R_1$ is hydrogen or mmethyl, $R_2$ is hydrogen or loweralkanoyl, $R_3$ is hydrogen or hydroxy, and $R_4$ is selected from the group consisting of loweralkyl, cycloalkyl, substituted cycloalkyl, aryl, substituted aryl, benzyl, and substituted benzyl. The present sulfonyl derivatives of erythromycin A, B and C are useful as antibiotics.

5 Claims, No Drawings

4''-O-SYLFONYL ERYTHROMYCIN-9-O-OXIME DERIVATIVES

REFERENCE TO RELATED APPLICATION

This is a continuation-in-part application of patent application filed under Ser. No. 356,988, filed May 3, 1973 and now abandoned.

DESCRIPTION OF THE INVENTION

This invention relates to antibiotic derivatives of erythromycin A, B and C, and more particularly to 4''-O-sulfonyl erythromycin A, B and C-9-O-oxime derivatives. The novel compounds of this invention have the following structural formula:

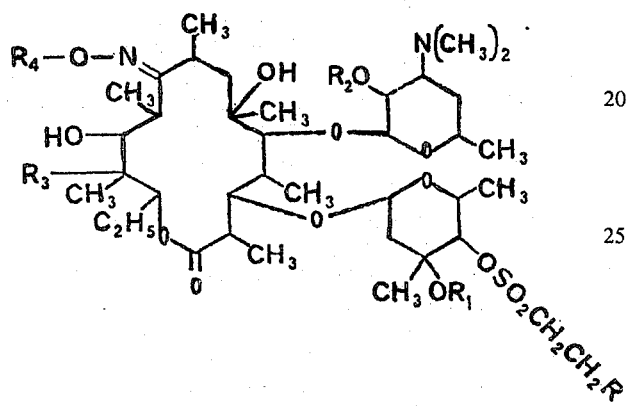

where R is selected from the group consisting of amino, monoalkyl amino, dialkyl amino, alkoxy, morpholino, substituted morpholino, piperazino, substituted piperazino, piperidino, substituted piperidino, alkylthio, alkylsulfonyl, arylthio, substituted arylthio, arylsulfonyl, substituted arylsulfonyl, thiamorpholino, aziridino, substituted aziridino, benzylthio, substituted benzylthio, thiamorpholinosulfone, substituted thiamorpholinosulfone, benzylsulfinyl, substituted benzylsulfinyl, arylsulfinyl, substituted arylsulfinyl, benzylsulfonyl, substituted benzylsulfonyl, cyanoalkyl, halocyanoalkyl, haloalkanoate, dialkanoate, ketoalkyl, ketoalkanoate, benzylamino, substituted benzylamino, benzoxy, substituted benzoxy, phenoxy, substituted phenoxy, benzylcyano, and substituted benzylcyano; $R_1$ is hydrogen or methyl, $R_2$ is hydrogen or loweralkanoyl, $R_3$ is hydrogen or hydroxy, and $R_4$ is selected from the group consisting of loweralkyl, cycloalkyl, substituted cycloalkyl, aryl, substituted aryl, benzyl, and substituted benzyl.

Erythromycin is produced in three forms denoted A, B and C by cultivating a strain of *Streptomyces erythreus* in a suitable nutrient medium as is taught in U.S. Pat. No. 2,653,899, Bunch, et al. The structure of erythromycin is represented by the following formula:

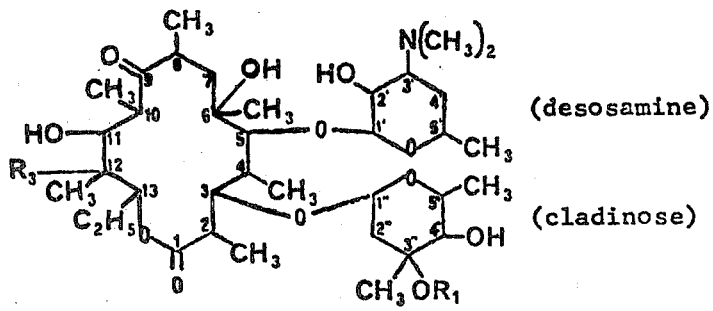

In this formula, when $R_1$ is methyl and $R_3$ is hydroxyl, the structure illustrated is erythromycin A. When $R_1$ is methyl and $R_3$ is hydrogen, the structure of erythromycin B is illustrated. When $R_1$ is hydrogen and $R_3$ is hydroxyl, the structure of erythromycin C is illustrated. The term "erythromycin" when used herein without modification is meant to embrace all three forms, that is, erythromycin A, B and C.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

The starting materials in preparing the compounds of the invention may be prepared via a diverse number of synthetic routes. However, the best procedure is to first form the 9-O-oxime derivative of erythromycin according to the techniques outlined in U.S. Pat. No. 3,681,326. By the methods enumerated there a number of oxime derivatives may be prepared to produce oxime erythromycins where $R_4$ is as defined above.

After the oxime derivative is prepared, thereafter said derivative is reacted to place a vinyl group on the 4''-position of the erythromycin molecule. The 4''-O-vinylsulfonyl erythromycin-9-O-oxime derivatives are best prepared by following the procedures outlined in commonly assigned application bearing Ser. No. 357,121 filed as of even date and now U.S. Pat. No. 3,836,519.

After the vinyl-oxime erythromycin derivatives are made, the compounds of this invention are prepared by reacting said derivative with a reactant having a labile hydrogen whereby addition across the erythromycin double bond (4'' vinyl group) is effected.

A wide variety of compounds may be reacted with the erythromycin reactant in this well known Michael reaction. For example, aliphatic, and cyclic amines may be employed. Likewise, aliphatic and aromatic mercaptans may be reacted with the erythromycin. Again, aliphatic and aromatic alcohols may be employed. In some instances the addition products across the vinyl group of the erythromycin may be further modified by various conventional steps. For example, if a mercaptan is reacted with the vinylsulfonyl erythromycin, the resultant thio compound may be oxidized to a sulfinyl or sulfonyl group. Other reactions involving oxidations, reductions, etc. may also be carried out once addition across the vinyl group has been accomplished.

When R in the above formula contains one or more alkyl groups normally the alkyl group is a loweralkyl group containing one to six carbon atoms, and more often one to four carbon atoms. When R includes a nitrogen heterocyclic, cyclic or aromatic group, such groups may also contain a wide variety of substituents on the ring. These may include alkyl, cyano, nitro, halo, amino, substituted amino, ester, alkoxy, mercapto, etc. groups. Likewise when R contains one or more alkyl groups the alkyl group may be likewise substituted with the just-mentioned substituents. The alkyl group may be either branched or a straight chain in character.

In addition to the erythromycin reactant being either erythromycin A, B or C, such starting material may also contain an alkanoyl group in the 2'-position. Normally such alkanoyl group contains one to six carbon atoms, and most often one to four carbon atoms. Thus, for example, the 2'-position may contain an acetyl, propionyl, butyryl, etc. group. Likewise, such alkanoyl groups may be placed on the molecule after the Michael addition reaction has taken place.

The following examples more clearly illustrate the invention:

EXAMPLE I

4''-O-(β-Phenylthioethyl)Sulfonyl Erythromycin B 9-O-Methyloxime

To a solution of 2.51 g. (3.00 mM.) of 4''-O-vinylsulfonyl erythromycin B-9-O-methyloxime in 50 ml. of benzene was added 1 ml. of thiophenol, followed by addition of 0.50 ml. of dimethylcyclohexylamine. This solution was allowed to stir at room temperature (24 hours). After this period of time, the reaction mixture was diluted with 500 ml. of fresh benzene. This solution was washed with 500 ml. portions of $H_2O$, 15 percent NaOH solution and again with $H_2O$. The organic layer was dried over $MgSO_4$, filtered and concentrated to leave 2.64 g. of a new product. This material was purified by recrystallization. Analysis of this compound for C, H and N agreed with the desired product as follows: $C_{46}H_{78}N_2O_{14}S_2$; M.W. — 947.24

| Analysis: | Theory: | C: 58.32, H: 8.30, N: 2.96 |
|---|---|---|
| | Found: | C: 58.16, H: 8.52, N: 2.83 |

EXAMPLE II

4''-O-(β-Phenylthioethyl)Sulfonyl Erythromycin A 9-O-Methyloxime

This product was prepared in the same manner as the compound of Example I. From 2.55 g. (3.00 mM.) 4''-O-vinylsulfonyl erythromycin A-9-O-methyloxime was obtained 1.93 g. of a crystalline material. This material was crystallized from acetone. M.P. — 170°–173° C. (dec.) Analysis of the compound for C, H and N agreed with the desired product as follows: $C_{46}H_{78}N_2O_{15}S_2$; M.W. — 963.24

| Analysis: | Theory: | C: 57.35, H: 8.16, N: 2.91 |
|---|---|---|
| | Found: | C: 57.40, H: 8.23, N: 2.77 |

EXAMPLE III

4''-O-(β-p-Aminophenylthioethyl)Sulfonyl Erythromycin A-9-O-Methyloxime

This product was prepared in the same manner as the compound of Example I with the exception that para-aminothiophenol was employed as a reactant with 4''-O-vinylsulfonyl erythromycin A-9-O-methyloxime. The product analyzed as follows: $C_{46}H_{79}N_3O_{15}S_2$.

| Analysis: | Theory: | C: 56.45, H: 8.14, N: 4.30 |
|---|---|---|
| | Found: | C: 56.95, H: 8.50, N: 4.20 |

Other erythromycin derivatives falling within the scope of the invention may be prepared by, for example, varying the particular sulfonyl chloride used by varying the R group in said sulfonyl chloride. Generally when R is alkyl it is a loweralkyl $C_{1-4}$ branched or straight chain. Likewise R may be any loweralkenyl group other than vinyl, generally $C_{1-4}$ branched or straight chain alkenyl. When R is substituted aryl the substituent on the benzene ring may be nitro, halo, alkyl, etc. The same substituents may be present when benzyl is substituted in the aromatic ring. Likewise, instead of erythromycin A or B, erythromycin C may be substituted as a reactant. Lastly, when the erythromycin reactant has its 2'-position substituted as alkanoyl, the $R_2$ group is usually a lower $C_{1-4}$ branched or straight chain alkanoyl.

Representative erythromycin derivatives here were tested for their antibiotic activity in vitro. The compounds were tested in vitro against a variety of gram negative and gram positive bacteria. Figures given below are MIC values in terms of mcg./ml.

EXAMPLE IV

4''-O-(β-Morpholinoethyl)Sulfonyl Erythromycin A-9-O-Methyloxime

To a solution of 3.40 g. (4.00 mM.) of 4''-O-vinylsulfonyl erythromycin A-9-O-methyloxime in 50 ml. of chloroform, 3 ml. of morpholine was added and allowed to stand at room temperature overnight. After standing overnight, the reaction was diluted with 300 ml. of fresh chloroform and washed with 200 ml. of $H_2O$ followed by 200 ml. of 5 percent $NaHCO_3$ solution. The organic layer was dried over $MgSO_4$, filtered and concentrated to leave 3.25 g. of crude product. This product was purified by column chromatography to obtain an analytically pure sample. The analysis agreed with the desired product.

EXAMPLE V

4''-O-(β-Morpholinoethyl)Sulfonyl Erythromycin B-9-O-Methyloxime

This compound was prepared by the same procedure as described in Example IV. From 3.30 g. (4.00 mM.) of 4''-O-vinylsulfonyl erythromycin B-9-O-methyloxime was obtained 3.15 g. of the desired product. This material was purified by column chromatography to obtain an analytically pure sample. The analysis agreed with the desired product.

EXAMPLE VI

4''-O-[β-N(m-Trifluoromethylphenyl-piperazino)Ethyl] Sulfonyl Erythromycin B-9-O-Methyloxime This compound was prepared by the same procedure as described in Example V. From 2.50 g. (3.00 mM.) of 4''-O-vinylsulfonyl erythromycin B-9-O-methyloxime was obtained 2.98 g. of the desired product. This material was purified by column chromatography to obtain an analytically pure sample. The analysis agreed with the desired product.

EXAMPLE VII

4''-O-[β-N-(m-Trifluromethylphenylpiperazino)Ethyl] Sulfonyl Erythromycin A-9-O-Methyloxime This compound was prepared by the same procedure as described in Example VI. From 2.55 g. (3.00 mM.) of 4''-O-vinylsulfonyl erythromycin A-9-O-methyloxime was obtained 3.22 g. of the desired product. This material was purified by column chromatography to obtain an analytically pure sample. The analysis agreed with the desired product.

EXAMPLE VIII

4''-O-(β-Thiomorpholinoethyl)Sulfonyl Erythromycin B-9-O-Methyloxime

This compound was prepared as described in Example VII. From 3.40 g. (4.00 mM.) of 4''-O-vinylsulfonyl erythromycin B-9-O-methyloxime was obtained 3.64 g. of the desired product. This material was purified by recrystallization from ether. The analysis agreed with the desired product.

EXAMPLE IX

4''-O-[β-(N-Benzylamino)Ethyl] Sulfonyl Erythromycin A-9-O-Methyloxime

This compound was prepared as described in Example VIII. From 4.20 g. (5.00 mM.) 4''-O-vinylsulfonyl erythromycin A-9-O-methyloxime was obtained 4.06 g. of the desired product. This material was purified by column chromatography to obtain an analytically pure sample. The analysis agreed with the desired product.

EXAMPLE X

4''-O-(β-Methoxyethyl)Sulfonyl Erythromycin A-9-O-Methyloxime

To a solution of 3.40 g. (4.00 mM.) 4''-O-vinylsulfonyl erythromycin A-9-O-methyloxime in 50 ml. of methanol, was added 5 ml. of 5 percent NaHCO$_3$ solution. This solution was allowed to stand at room temperature for 2 weeks. After this period of time, the solution was poured into 500 ml. of 5 percent NaHCO$_3$ solution and extracted twice with 300 ml. of chloroform. The extracts were combined, dried over MgSO$_4$, filtered and concentrated to leave 2.90 g. of desired product. This product was purified by column chromatography to obtain an analytically pure sample. The analysis agreed with the desired product.

EXAMPLE XI

4''-O-(β-Dimethylaminoethyl)Sulfonyl Erythromycin A-9-O-Methyloxime

This compound was prepared by the same procedure as described in Example IV. From 4.20 g. (5.00 mM.) of 4''-O-vinylsulfonyl erythromycin A-9-O-methyloxime was obtained 3.94 g. of the desired product. This material was purified by recrystallization from isopropyl alcohol to obtain an analytically pure sample. M.P.—208°–210° C. The analysis agreed with the desired product.

EXAMPLE XII

4''-O-(β-Phenoxyethyl)Sulfonyl Erythromycin A-9-O-Methyloxime

To a cooling solution of 3.05 g. (4.00 mM.) of erythromycin A-9-O-methyloxime in 50 ml. of pyridine, 1.8 g. (8.00 mM.) of β-phenoxyethylsulfonyl chloride was added in one portion. After the addition, the reaction was allowed to stir in the ice bath for 1 hour. After this period of time, the reaction was poured into 500 ml. of 5 percent NaHCO$_3$ solution and extracted twice with 300 ml. portions of chloroform. The extracts were combined, dried over MgSO$_4$, filtered and concentrated to leave 3.60 g. of desired product. This material was purified by recrystallization from isopropyl alcohol to obtain an analytically pure sample. M.P.—132°–135° C. The analysis agreed with the desired product.

EXAMPLE XIII

4''-O-(β-Phenoxyethyl)Sulfonyl Erythromycin B-9-O-Methyloxime

This material was prepared as described in Example XII. From 3.00 g. (4.00 mM.) of erythromycin B-9-O-methyloxime was obtained 3.70 g. of the desired product. This material was purified by column chromatography to obtain an analytically pure sample. The analysis agreed with the desired product.

EXAMPLE XIV

4''-O-(β-Phthalimidoethyl)Sulfonyl Erythromycin A-9-O-Methyloxime

This compound was prepared as described in Example XII. From 7.60 g. (0.01 M.) erythromycin A-9-O-methyloxime and 5.20 g. (0.02 M.) of β-phthalimidoethanesulfonyl chloride was obtained 9.73 g. of the desired product. This material was purified by recrystallization from 12-A alcohol to obtain an analytically pure sample. M.P.—197°–198° C. The analysis agreed with the desired product.

EXAMPLE XV

4''-O-(β-Aminoethyl)Sulfonyl Erythromycin A-9-O-Methyloxime

To a solution of 6.43 g. (6.43 mM.) of 4''-O-(β-phthalimidoethyl)sulfonyl erythromycin A-9-O-methyloxime in 150 ml. of dioxane, 7.5 ml. of hydrazine (95+ percent) was added, followed by 10 ml. of H$_2$O. This solution was allowed to stir at room temperature for 2 days. After this period of time, the solution was poured into 500 ml. of 5 percent NaHCO$_3$ solution and extracted twice with 300 ml. portions of chloroform. The extracts were combined and washed with 300 ml. of cold H$_2$O. The organic layer was dried over MgSO$_4$, filtered and concentrated to leave 5.69 g. of desired product. This material was purified by recrystallization from ether to obtain an analytically pure sample. M.P.—139°–142° C. The analysis agreed with the desired product.

A wide variety of organisms were used to test the in vitro activity of the compounds here. These are as follows:

1. *Staphylococcus aureus* 9144
2. *Staphylococcus aureus* Smith
3. *Staphylococcus aureus* Smith ER
4. *Staphylococcus aureus* Quinones
5. *Staphylococcus aureus* Wise 155
6. *Streptococcus faecalis* 10541
7. *Escherichia coli* Juhl
8. *Klebsiella; pneumoniae* 10031
9. *Proteus vulgaris* Abbott JJ
10. *Proteus mirabilis* Finland No. 9
11. *Salmonella typhimurium* Ed No. 9
12. *Shigella sonnei* 9290

-Continued
13. *Pseudomonas aeruginosa* BMH No. 10
14. *Streptococcus pyogenes* Roper
15. *Streptococcus pyogenes* Scott
16. *Haemophilus influenzae* 9334
17. *Haemophilus influenzae* Brimm CSF
18. *Haemophilus influenzae* Illinois
19. *Haemophilus influenzae* Paterson
20. *Haemophilus influenzae* Shemwell
21. *Haemophilus influenzae* Terry
22. *Myco. gallisepticum* S6
23. *Myco. granularum* 19168
24. *Myco. hyorhinis* 17981
25. *Myco. pneumoniae* FH
26. *Trichomonas vaginalis* C1M1
27. *Crithidia fasciculata*
28. *Staphylococcus aureus* 209 P ER
29. *Staphylococcus aureus* MIH No. 7
30. *Staphylococcus aureus* Wise J. 66
31. *Staphylococcus aureus* Wise J. 348
32. *Staphylococcus aureus* Wise J. 419
33. *Staphylococcus aureus* Wise J. 645
34. *Diplococcus pneumoniae* Dixon 23

In vitro results are as follows:

TABLE I - EXAMPLE I

| Organism No. | MIC |
|---|---|
| 1 | .78 |
| 2 | .78 |
| 3 | >100 |
| 4 | 6.2 |
| 5 | 3.1 |
| 6 | .39 |
| 7 | >100 |
| 8 | >100 |
| 9 | >100 |
| 10 | >100 |
| 11 | >100 |
| 12 | >100 |
| 13 | >100 |
| 14 | >100 |
| 15 | >100 |
| 16 | >100 |
| 17 | 50 |
| 18 | >100 |
| 19 | >100 |
| 20 | 100 |
| 21 | >100 |
| 22 | .05 |
| 23 | 2.5 |
| 24 | 25 |
| 25 | .50 |
| 26 | 25 |
| 27 | >100 |
| 4 | 3.1 |
| 5 | 3.1 |
| 2 | .20 |
| 28 | 1.56 |
| 3 | >100 |
| 29 | 1.56 |
| 30 | 1.56 |
| 31 | 1.56 |
| 32 | 1.56 |
| 33 | 1.56 |

TABLE II - EXAMPLE II

| Organism No. | MIC |
|---|---|
| 1 | 3.1 |
| 2 | 1.56 |
| 3 | >100 |
| 4 | 6.2 |
| 5 | 6.2 |
| 6 | .39 |
| 7 | >100 |
| 8 | >100 |
| 9 | >100 |
| 10 | >100 |
| 11 | >100 |
| 12 | >100 |
| 13 | >100 |
| 14 | >100 |
| 15 | >100 |
| 16 | >100 |
| 17 | >100 |
| 18 | >100 |
| 19 | >100 |
| 20 | >100 |
| 21 | >100 |
| 22 | .25 |
| 23 | 10 |
| 24 | >100 |
| 25 | 5 |
| 26 | >100 |
| 27 | >100 |
| 4 | 50 |
| 5 | 20 |
| 2 | 3.1 |

TABLE III - EXAMPLE IV

| Organism No. | MIC |
|---|---|
| 1 | .39 |
| 2 | .39 |
| 3 | >100 |
| 4 | 3.1 |
| 5 | 3.1 |
| 6 | .20 |
| 7 | >100 |
| 8 | 12.5 |
| 9 | >100 |
| 10 | >100 |
| 11 | >100 |
| 12 | >100 |
| 13 | >100 |
| 14 | >100 |
| 15 | >100 |
| 16 | 50 |
| 17 | 12.5 |
| 18 | 50 |
| 19 | 50 |
| 20 | 12.5 |
| 21 | 25 |
| 22 | .25 |
| 23 | .50 |
| 24 | 100 |
| 25 | .25 |
| 26 | >100 |
| 27 | 50 |
| 4 | 1.56 |
| 5 | 1.56 |
| 2 | .39 |
| 28 | .78 |
| 3 | >100 |
| 29 | 1.56 |
| 30 | 1.56 |
| 31 | 1.56 |
| 32 | 1.56 |
| 33 | .78 |

TABLE IV - EXAMPLE VI

| Organism No. | MIC |
|---|---|
| 1 | 1.56 |
| 2 | 1.56 |
| 3 | >100 |
| 4 | 3.1 |
| 5 | 3.1 |
| 6 | 1.56 |
| 7 | >100 |
| 8 | >100 |
| 9 | >100 |
| 10 | >100 |
| 11 | >100 |
| 12 | >100 |
| 13 | >100 |
| 14 | >100 |
| 15 | >100 |
| 16 | >100 |
| 17 | >100 |
| 18 | >100 |
| 19 | >100 |
| 20 | >100 |
| 21 | >100 |
| 22 | .25 |
| 23 | 50 |

TABLE IV - EXAMPLE VI (Continued)

| Organism No. | MIC |
|---|---|
| 24 | 100 |
| 25 | .25 |
| 26 | >100 |
| 27 | 25 |

TABLE V - EXAMPLE VII

| Organism No. | MIC |
|---|---|
| 1 | .78 |
| 2 | .78 |
| 3 | >100 |
| 4 | 3.1 |
| 5 | 3.1 |
| 6 | .78 |
| 7 | >100 |
| 8 | >100 |
| 9 | >100 |
| 10 | >100 |
| 11 | >100 |
| 12 | >100 |
| 13 | >100 |
| 14 | >100 |
| 15 | >100 |
| 16 | >100 |
| 17 | >100 |
| 18 | >100 |
| 19 | >100 |
| 20 | >100 |
| 21 | >100 |
| 22 | .25 |
| 23 | 2.5 |
| 24 | 25 |
| 25 | .50 |
| 26 | 25 |
| 27 | >100 |
| 4 | .78 |
| 5 | .78 |
| 2 | .78 |
| 28 | .78 |
| 3 | >100 |
| 29 | .78 |
| 30 | .78 |
| 31 | .78 |
| 32 | 1.56 |
| 33 | .78 |

TABLE VII - EXAMPLE XII

| Infection | Dosage Levels mg./kg. | | | | |
|---|---|---|---|---|---|
| | 300 | 150 | 75 | 37.5 | 18.75 |
| 2 | 90 | 10 | 0 | 0 | 0 |

TABLE VIII - EXAMPLE XIII

| Infection | Dosage Levels mg./kg. | | | | |
|---|---|---|---|---|---|
| | 300 | 150 | 75 | 37.5 | 18.75 |
| 2 | 50 | 0 | 0 | 0 | 0 |

TABLE IX - EXAMPLE XIV

| Infection | Dosage Levels mg./kg. | | | | |
|---|---|---|---|---|---|
| | 300 | 150 | 75 | 37.5 | 18.75 |
| 2 | 50 | 0 | 0 | 0 | 0 |

The compounds of the invention here are useful as antibiotics when administered to warm-blooded animals at a preferred dosage of 25–2000 mg./kg. of body weight daily to treat infections in which one of the above or another susceptible bacterial organisms is the causative agent. More often the dosage is 75–1000 mg./kg.

Although administration is possible by the intraperitoneal route wherein the dose is dissolved or suspended in an inert physiologically harmless agent such as aqueous tragacanth, the preferred route is oral, either in capsule or tablet form. Capsules can, in addition to the active erythromycin also contain inert fillers such as lactose.

Tablets are made in the usual manner on tableting presses, and although the active compounds may be tableted alone, it is preferred that a release agent such as magnesium stearate to aid in freeing the tablets from the machine dies during manufacture, together with a binder such as starch to assure good particle cohesion are included in a blend of active ingredient and diluents prior to tableting. After tableting, the tablets can be coated if desired. A preferred blend for tableting is as follows:

| | Percent |
|---|---|
| Erythromycin Compound | 77 |
| Magnesium stearate | 2 |
| Starch powder | 21 |

We claim:

1. A 4''-O-sulfonyl erythromycin-9-O-oxime derivative of the following structural formula:

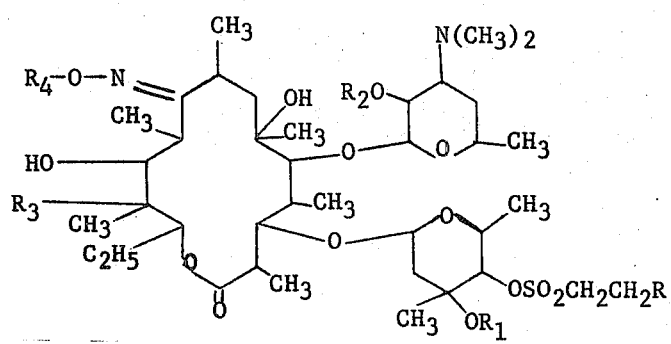

where R is selected from the group consisting of amino, monoalkyl amino, $C_1-C_6$ dialkyl amino, alkoxy, morpholino, piperazino, piperidino, $C_1-C_6$ alkylthio, $C_1-C_6$ alkylsulfonyl, arylthio, arylsulfonyl, thiamorpholino, aziridino, benzylthio, thiamorpholinosulfone, benzylsulfinyl, arylsulfinyl, benzylsulfonyl, cyanoalkyl, haloalkanoate, dialkanoate, ketoalkyl, ketoalkanoate, benzylamino, benzoxy, phenoxy, and benzylcyano; $R_1$ is hydrogen or methyl, $R_2$ is hydrogen or loweralkanoyl, $R_3$ is hydrogen or hydroxy, and $R_4$ is selected from the group consisting of a $C_1-C_6$ loweralkyl, cycloalkyl, aryl, and benzyl.

2. The derivative of claim 5 wherein R is phenylthio, $R_1$ and $R_4$ are methyl, and $R_2$ and $R_3$ are hydrogen.

3. The derivative of claim 5 wherein R is phenylthio, $R_1$ and $R_4$ are methyl, $R_2$ is hydrogen, and $R_3$ is hydroxyl.

4. The derivative of claim 5 wherein R is paraaminophenylthio, $R_1$ and $R_4$ are methyl, $R_2$ is hydrogen, and $R_3$ is hydroxyl.

5. A 4''-O-sulfonyl erythromycin-9-O-oxime derivative of the structural formula:

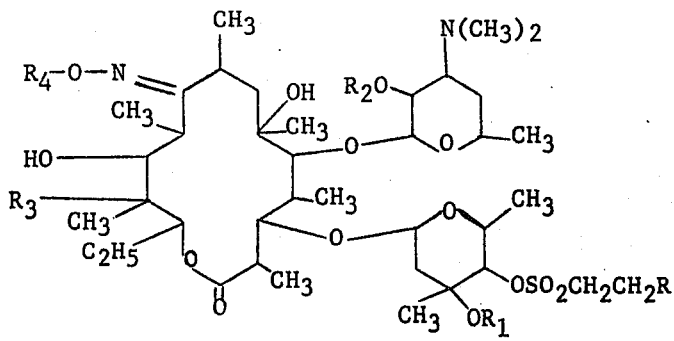

where R is selected from the group consisting of phenylthio and paraminophenylthio, $R_1$ and $R_4$ are methyl, $R_2$ is hydrogen, and $R_3$ is selected from the group consisting of hydrogen and hydroxyl.

* * * * *

UNITED STATES PATENT AND TRADEMARK OFFICE
CERTIFICATE OF CORRECTION

PATENT NO. : 3,869,445
DATED : March 4, 1975
INVENTOR(S) : Robert Hallas, John Soloman Tadanier and Anne Mary Von Esch It is certified that error appears in the above—identified patent and that said Letters Patent are hereby corrected as shown below:

Column 9, after the Table V - Example VII, please insert the following table:

--TABLE VI - EXAMPLE XI

| Infection | Dosage Levels mg./kg. | | | | |
|---|---|---|---|---|---|
| | 300 | 150 | 75 | 37.5 | 18.75 |
| 2 | 80 | 0 | 0 | 0 | 0 | -- |

Signed and Sealed this twenty-fifth Day of November 1975

[SEAL]

Attest:

RUTH C. MASON
Attesting Officer

C. MARSHALL DANN
Commissioner of Patents and Trademarks